Jan. 19, 1971   E. K. KOPPELMANN   3,555,643
ROLLER BURNISHING TOOL
Filed Nov. 19, 1968
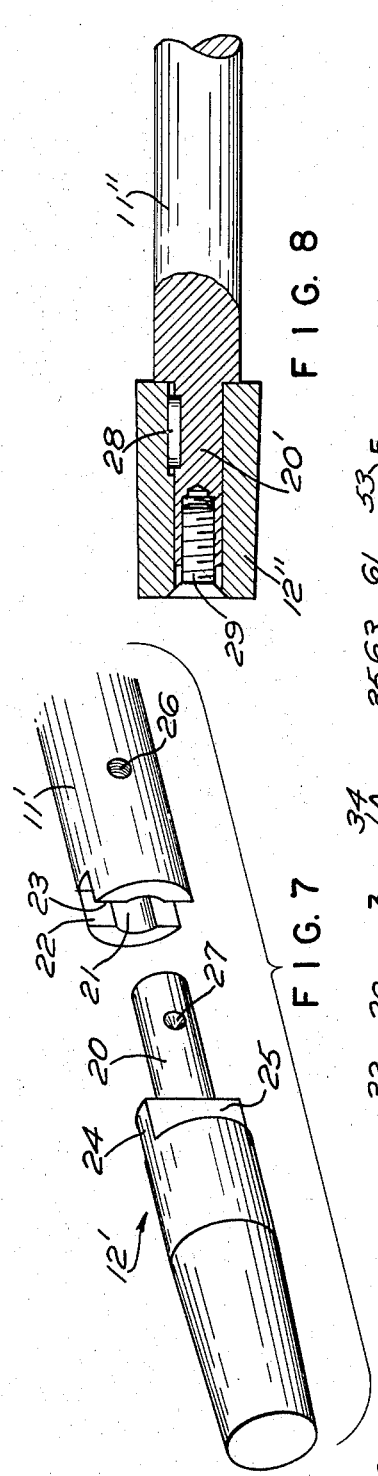
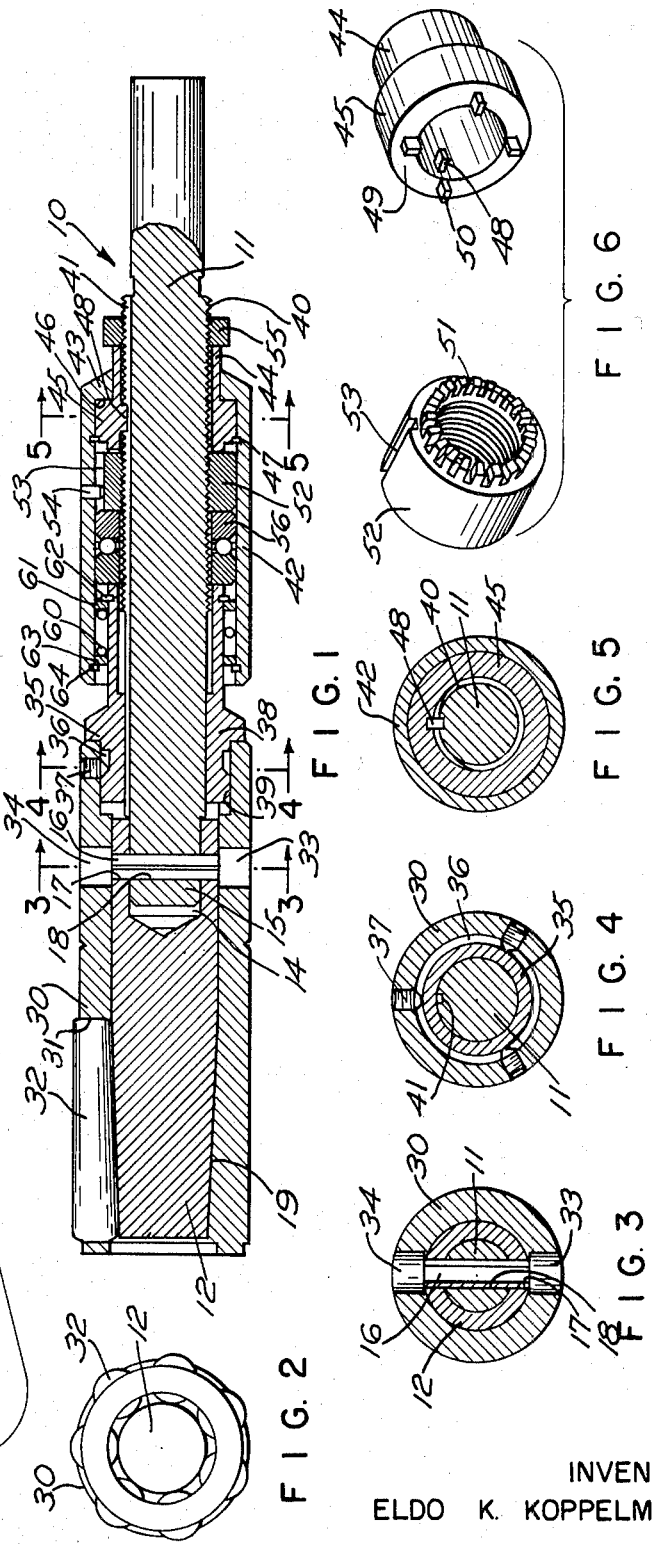
INVENTOR
ELDO K. KOPPELMANN
BY
*Barlow & Barlow*
ATTORNEYS

United States Patent Office 3,555,643
Patented Jan. 19, 1971

3,555,643
ROLLER BURNISHING TOOL
Eldo K. Koppelmann, Cumberland, R.I., assignor to Madison Industries, Inc., a corporation of Rhode Island
Filed Nov. 19, 1968, Ser. No. 777,008
Int. Cl. B24b 39/04
U.S. Cl. 29—90                                    6 Claims

ABSTRACT OF THE DISCLOSURE

A roller burnishing tool having a common adjustable housing with a shank extension therefor and with a mandrel and cage body which will be interchangeable to change the size of the part to be burnished. The body of the tool includes a release spring means that serves also as the spring loading for the adjustment means.

BACKGROUND OF THE INVENTION

Tools for finishing cylindrical bearing surfaces by rolling are in general use today in the machining industry and operate by utilizing a tapered mandrel surrounded by a cage in which a series of tapered rollers are housed. The rollers are either inserted into a bore to be burnished or are placed about a cylindrical surface, and because of the inclination of the rolls to the axis of the cage, the rolls will automatically feed in the bore or over the outside surface of the cylindrical part forming a smooth burnished surface. It has been common in the machine tool industry to provide such tools that operate over a small range of sizes. However, for general purposes, it is quite feasible to find that the housings on a range of sizes is identical. Threading detachment of the cage alone as in Pat. 3,069,750 is not satisfactory as it is virtually impossible to detach the cage after the tool has been in use.

SUMMARY OF THE INVENTION

The instant invention revolves about a roller burnishing tool that has the operating or end portions thereof which includes the mandrel and the roller cage assembly easily detachable from the main body of the tool. The main body of the tool which includes the mandrel shank to which the mandrel tip is coupled includes a release spring means that is coupled to the cage and this release spring means also serves as a biasing spring for a clutch release type of adjustment means to vary the position of the mandrel relative to the cage. The mandrel which controls the expansions of the rollers and the cage is formed in two parts held together by some removable pin which holds the two parts of the mandrel together. The housing for adjusting the position of the roller cage relative to the mandrel is a single piece of material which houses the clutch means within to adjust the position of the cage with reference to the mandrel for sizing the diameter to which the rolls may operate.

DESCRIPTION OF THE DRAWINGS

FIG. 1 is a central sectional view through the tool;
FIG. 2 is an end view of the tool;
FIGS. 3, 4 and 5 are sections on lines of corresponding numbers in FIG. 1;
FIG. 6 is an exploded perspective view showing the engaging parts of a clutch means for relatively adjusting the roller cage with reference to the mandrel;
FIG. 7 is an exploded perspective view of alternate or modified means of detachably connecting the two parts of the mandrel; and
FIG. 8 is a sectional view of a further modification of means for detachably connecting the two parts of the mandrel.

DESCRIPTION OF THE PREFERRED EMBODIMENT

With reference to the drawings 10 designates generally the mandrel which has a rear shank portion 11 driven at its rear end and a forward tapered tip portion 12. In FIG. 1 a recess 14 in the forward tip portion telescopingly receives the end 15 of the shank portion of the mandrel therein which is locked by means of a lengthwise split tubular cylindrical spring pin 16 extending through registering opening 17 in the tip portion 12 and 18 in the shank portion 11.

In some cases, as in FIG. 7, the tip portion 12' may have a reduced part 20 to extend into an opening 21 in the shank portion 11' with spaced flat portions 22 and 23 to receive the flat surfaces 24 and 25 on the tip portion 12'. A threaded opening 26 accommodates a set screw to extend into a conical notch 27 in the reduced portion 20 so as to lock the two parts of the mandrel comprising the shank and the tip in rotary driving relation. A further alternate in FIG. 8 shows the mandrel 11" reduced as at 20' and the tapered tip 12" keyed to the reduced portion as at 28 and held in position by screw 29 in the reduced end 20'.

A cage 30 embraces the mandrel tip and has a plurality of openings 31 for the reception of the rollers 32 which engage the tapered portion 19 of the mandrel tip. The openings and rollers are skewed very slightly with respect to the plane through the axis of the mandrel to display a natural tendency to create a helical path of movement carrying the rollers 32 toward the larger end of the tapered surface 19. This cage extends over the telescoping connection between the mandrel tip and the shank and is provided with diametrically opposite openings 33 and 34 so that the spring pin 16 may be driven from locking position to release the tip from the shank or for access to the set screw which engages the opening 26 in the mandrel shank shown in the modified form for a similar release. A cage extension 35, which is separable from the cage 30, embraces the mandrel shank 11 and is releasably locked to the cage 30 by a set screw 37 engaging a recess 36 in a portion 38 of the cage extension 35 that telescopes into an enlarged bore 39 in the inner end of the cage 30.

Control of relative axial positions of cage and mandrel

The mandrel shank 11 is threaded as at 40 along a portion of its length and is provided with a keyway 41 extending axially from its forward end. A one-piece housing 42 embraces a substantial portion of the threaded part 40 of the mandrel shank and contains a number of operating parts therein. This housing has an end 43 through which there extends a coupling ring 44 which is enlarged as at 45 to engage the end 43 as at 46. This ring 44 is locked in position against axial movement in the housing by a spring ring 47 in the inner surface of the housing and is freely rotatable in the housing but is keyed to the mandrel by means of a key 48 engaging the keyway 41. The face 49 of this ring is provided with a plurality of teeth 50 (see FIG. 6) which enter selected spaces 51 in the nut 52 having threads engaging the threads 40 on the mandrel shank 11. Relative rotation of the ring and nut may be had by withdrawing the teeth from the spaces 51 and relatively rotating these two parts. A keyway 53 in nut 52 receives a key 54 extending inwardly from the housing so as to secure the nut 52 to the housing against relative rotation although permitting relative axial movement of the housing and the nut. A lock nut 55 engaging threads 40 and the end of ring 44 prevents undesired decoupling of the nut and ring. A thrust bearing 56 freely movable axially along the threaded portion of the mandrel shank is engaged by the nut 52 and may be moved along the shank as the nut is moved through relative threaded engagement and relative rotation of the two. This thrust ball bearing 56 engages the end of the cage extension 35 so that when the nut 52 is moved toward the mandrel tip along the mandrel, the cage extension 35 and cage 30 will be similarly moved with reference to the mandrel. A spring 60 acts between washers 61 and 63 urging washer 61 against the split ring 62, forming an abutment on the cage extension and urging the washer 63, which engages the split ring 64, forming an abutment on the inner surface of the housing in the opposite direction, thus serving to move the housing 42 to the left in FIG. 1 and the cage extension to the right against the thrust bearing 56, as shown in FIG. 1. The housing 42 may be slid relative to the mandrel by moving the housing to the right as shown in FIG. 1 to compress the spring and disengages the ring 44 and nut 52 after the locking nut 55 has been moved to the right on the threads 40 of the mandrel shank.

For relative adjustment of the cage and mandrel, the housing, as shown in FIG. 1, may be pulled to the right to release the clutching engagement between the ring 44 and the nut 52 and then relative rotation of the housing and the mandrel shank may be had to move the nut 52 and thrust bearing 56 one way or the other to vary the size to which the tapered end or tip of the mandrel may engage the cage with the rollers therein.

The effect of the axial movement of the housing 42 with respect to the mandrel 11, 12 is to move the thrust bearing 56 which limits the movement of the cage member 30 in an axial direction to the right in FIG. 1 with respect to the housing 42 and consequently with respect to the mandrel 11, 12. The thrust bearing, therefore, determines the limit position to which the rollers 32 are permitted to move in proceeding toward the larger diameter of the tapered surface 19. The rollers being skewed very slightly with respect to the plane through the axis of the mandrel 11, 12 display a natural tendency to create a helical path of movement moving the rollers toward the larger diameter of the tapered surface 19. The setting of the working diameter of the tool consists in establishing the position of the rollers along the tapered surface 19.

If the axial movement of the mandrel with respect to the workpiece is arrested such as by stopping the advance of the mandrel into the portion which is being burnished, the helical path of movement of the rollers with respect to the workpiece will tend to carry the rollers toward the minor diameter of the tapered surface 19, and the cage member 30, 35 will display an axial movement to the left with respect to the housing 42 accompanied by the compression of the spring 60 and a reduction of the operating diameter as the smaller portion of the mandrel is encountered by the rollers. During the entire operation, the housing is relatively fixed with respect to the mandrel by the action of the connection 48, 53. The spring 60 is retained between the bearing washers 61 and 63.

It will be seen from the above that the spring 60 acts as a means to permit release by the feeding of the cage forwardly to the smaller diameter of the mandrel tip and also acts as a means for holding the ring 44 and the nut 52 in engagement or permitting them to be relatively pulled out of engagement for adjusting the position of the thrust bearing. Thus, this single spring in this assembly acts doubly and takes the place of two springs in prior art construction.

I claim:

1. A roller burnishing tool comprising a mandrel having a forward part and a rear part, releasable means drivingly connecting said parts, said forward part having an external taper, a roller cage embracing said mandrel and containing a group of rollers engaging said external taper and a portion embracing said releasable means, said cage having means providing access to said releasable means for effecting release of said forward and rear parts of said mandrel.

2. A tool as in claim 1 wherein a cage extension embraces the rear part of said mandrel and said cage is detachably connected to said cage extension to move therewith.

3. A roller burnishing tool comprising a mandrel, a roller cage embracing the same and axially movable with reference to said mandrel, abutment means limiting the relative axial movement in one direction, adjustable means detachably attached to said abutment means for adjusting said abutment means along said mandrel and a single spring acting in the other direction to cause limiting engagement of said abutment means and the detachable engagement of said adjustable means.

4. A roller burnishing tool as in claim 3 wherein said adjustable means comprises a nut threadingly engaging said mandrel and a housing keyed to said nut and axially movable relative to said nut.

5. A roller burnishing tool as in claim 3 wherein said adjustable means comprises a nut threadingly engaging said mandrel and a housing keyed to said nut and axially movable relative to said nut and a ring rotatable relative to said housing and axially movable therewith, said ring being keyed to said mandrel to move rotatably therewith and axially relatively thereto.

6. A roller burnishing tool as in claim 5 wherein a lock nut threadedly engaging said mandrel holds the ring in adjusted position.

References Cited
UNITED STATES PATENTS

| | | | |
|---|---|---|---|
| 2,069,099 | 1/1937 | Satterthwaite | 29—90 |
| 2,843,918 | 7/1958 | Koppelmann | 29—90 |
| 3,069,750 | 12/1962 | Koppelmann | 29—90 |

GIL WEIDENFELD, Primary Examiner